(12) United States Patent
Imoh

(10) Patent No.: US 11,861,685 B2
(45) Date of Patent: Jan. 2, 2024

(54) REPRESENTATION OF A USER IN VIRTUAL OUTFITS FROM A VIRTUAL WARDROBE

(71) Applicant: Uchenna Cornelia Imoh, Charleston, WV (US)

(72) Inventor: Uchenna Cornelia Imoh, Charleston, WV (US)

( * ) Notice: Subject to any disclaimer, the term of this patent is extended or adjusted under 35 U.S.C. 154(b) by 0 days.

(21) Appl. No.: 17/246,780

(22) Filed: May 3, 2021

(65) Prior Publication Data

US 2022/0351282 A1  Nov. 3, 2022

(51) Int. Cl.
*G06T 15/20* (2011.01)
*G06Q 30/06* (2023.01)
*G01W 1/10* (2006.01)
*G06Q 30/0601* (2023.01)

(52) U.S. Cl.
CPC .......... *G06Q 30/0643* (2013.01); *G01W 1/10* (2013.01); *G06Q 30/0621* (2013.01); *G06T 15/205* (2013.01); *G06T 2215/16* (2013.01)

(58) Field of Classification Search
None
See application file for complete search history.

(56) References Cited

U.S. PATENT DOCUMENTS

| 11,120,626 | B1* | 9/2021 | Alhebshi | G06T 19/00 |
| 2020/0005386 | A1* | 1/2020 | Blossey | G06T 19/006 |
| 2021/0233152 | A1* | 7/2021 | Penner | G06Q 30/0643 |
| 2021/0241531 | A1* | 8/2021 | Lee | G06F 18/217 |
| 2022/0031068 | A1* | 2/2022 | Jang | D06F 58/263 |
| 2022/0198780 | A1* | 6/2022 | Doba | G06F 16/538 |

* cited by examiner

*Primary Examiner* — Tize Ma
(74) *Attorney, Agent, or Firm* — Ashok Tankha

(57) ABSTRACT

A method and a virtual dressing system (VDS) for rendering a representation of a user in outfits from a virtual wardrobe are provided. The VDS acquires images of outfits via scanning using a camera or from a user device to store the images in a virtual wardrobe. The VDS acquires and displays on an interactive full-length display panel weather information of predetermined locations. The VDS scans the body of the user to generate a user image and selects outfits appropriate to the acquired weather and dimensions of the generated user image from images of outfits in the virtual wardrobe or in preselected locations on a computer network. The VDS displays the images of the selected outfits. On receiving a choice of an outfit from the user, the VDS renders a representation of the user in the chosen outfit on the full-length interactive display panel, updating the rendition on request.

10 Claims, 4 Drawing Sheets

REPRESENTATION OF A USER IN VIRTUAL OUTFITS FROM A VIRTUAL WARDROBE

BACKGROUND

Clothing is a basic need of people, and is a ubiquitous aspect of life. People clothe themselves for all occasions and at all times with a few exceptions. Choosing the clothes people choose to wear is a decision that persons make all the time. At present, a user needs to sort through the entire set of clothes in his wardrobe before he can find suitable clothing for the occasion, day, or weather. For finding appropriate set of clothes, a user may have to try multiple articles of clothing for size and suitability. If the user does not like an article of clothing, the user may set the clothing article aside, fold the clothing article, or hang the clothing article using a clothes hanger, and store the clothing article back in the wardrobe. This may result in the article of clothing getting wrinkled and loose its ironing. The clothing article may also become dirty in the process. The system and method disclosed herein overcomes these issues by a process referred herein as wardrobe virtualization by interfacing of the digital realm with the real world in a near seamless manner by projecting virtual representations of a user in various clothing articles thereby allowing the user to select the most appropriate articles of clothing in the shortest amount of time.

Deciding on outfits to wear on any particular day or for a particular occasion consumes mental resources and time, in some cases to a great extent. The user has to not only decide on the clothing, but also think of accessories such as jewelry, hats, ties, belts, watches, footwear, etc., that go along well with the clothing to match the clothing. While appearance and suitability for occasions dictate the choice of outfits at one end, weather conditions necessitate the requirement of certain clothing materials, layering of clothes, and accessories such as scarves, mufflers, and facemasks. Furthermore, people have wardrobes with multiple clothes and accessories that suit a given situation or event, making it a task to select the most appropriate wardrobe for the occasion. Accordingly, a method and a system that can suggest suitable clothing appropriate for the weather conditions on any particular day is a long-felt need among people. Furthermore, a method and a system that can show a user what they would look like in a particular outfit selected by the user from a virtual wardrobe of outfits without having to actually wear the outfit to look in a mirror is a long felt but unresolved need.

Hence, there is a long-felt but unresolved need for a method and a system for rendering a representation of a user in outfits from a virtual wardrobe that comprises virtual representations of real outfits stored in a wardrobe, for example, a personal wardrobe of the user. There is also a long-felt but unresolved need for obviating the need to physically shuffle through clothes and accessories, try out various combinations of clothing items and accessories to select an outfit, and worry about an outfit not being appropriate for the prevailing weather.

SUMMARY OF THE INVENTION

This summary is provided to introduce a selection of concepts in a simplified form that are further disclosed in the detailed description of the invention. This summary is not intended to determine the scope of the claimed subject matter.

The method and the system disclosed herein address the above-recited need for rendering representations of a user in different outfits from a virtual wardrobe comprising virtual representations of real outfits stored in a personal wardrobe of the user. Furthermore, the method and the system disclosed herein provides the user with options to save and share the rendered representations. The method and the system disclosed herein comprises a virtual dressing system. The virtual dressing system acquires images of outfits comprising clothing and accessories via scanning the outfits using a camera or receiving the images of the outfits from a user device to store the images in a virtual wardrobe. In an embodiment, the outfits comprising clothing and accessories are part of the user's personal wardrobe in the user's home. The virtual wardrobe is stored on a non-transitory computer readable storage medium. The virtual dressing system acquires weather information comprising weather and weather forecast information of physical locations predetermined by the user. The virtual dressing system displays the acquired weather information on a portion of an interactive full-length display panel. The interactive full-length display panel is a display panel that can display the entire length of a user of average height. Moreover, the interactive full-length display panel comprises interactive elements, for example, a touchscreen display, physical buttons, joysticks, a keyboard, a mouse, voice command interfaces, etc., for the user to interact with it. In an embodiment, the interactive full-length display panel houses the virtual dressing system, the camera, the non-transitory computer readable storage medium and a processor configured to execute the computer program instructions defined by the modules of the virtual dressing system. In an embodiment, the interactive full-length display panel is designed to function as a virtual mirror or a smart mirror positioned on the floor in the same manner as a standard full-length standing mirror with a frame. In an embodiment, the interactive full-length display panel is intended to function as a full-length standing mirror albeit virtually without the user having to physically change outfits to check the fit and suitability of the outfits.

The virtual dressing system scans the body of the user using the camera to generate a user image. The virtual dressing system selects outfits appropriate to the acquired weather information of a physical location predetermined by the user and dimensions of the generated user image from images of outfits in the virtual wardrobe or in preselected locations on a computer network. The outfits comprise mixing and matching of items of clothing with items of accessories. The virtual dressing system displays the images of the selected outfits on the interactive full-length display panel, where the selected outfits are computer selected outfits. The virtual dressing system receives, from the user, a choice of an outfit from the displayed images of the selected outfits and other outfits in the virtual wardrobe, where the selected outfits are computer selected outfits. The virtual dressing system receives the choice of an outfit as a corresponding request from the user via the interactive full-length display panel or the user device. In an embodiment, the virtual dressing system receives input comprising user requests via a software application on the user device, wherein the software application on the user device comprises modules of the virtual dressing system. On receiving a request from the user via the interactive full-length display panel or the user device, the virtual dressing system saves the chosen outfits of the user in a section of the virtual wardrobe.

The virtual dressing system renders a representation of the user in the chosen outfit on the full-length interactive display panel. In an embodiment, the virtual dressing system updates the rendered representation of the user on receiving a choice of a different outfit as a corresponding request from the user via the interactive full-length display panel or the user device. The virtual dressing system stores an individual profile for the user comprising the generated user image, the virtual wardrobe and user preferences on the non-transitory computer readable storage medium. The user preferences comprise information of physical locations for which weather is sought, user-selected locations on a computer network from which the virtual dressing system selects appropriate outfits, social media information provided by the user, and choices of outfits and rendered representations of the user that the user requests the virtual dressing system to save. Consequently, multiple users can use the virtual dressing system using the same camera and on a single interactive full-length display panel with a separate individual profile for each user. Moreover, the virtual dressing system, on receiving a request from the user via the interactive full-length display panel or the user device, uploads user-selected rendered representations of the user and the images of the outfits in the virtual wardrobe to social media. Furthermore, in certain embodiments, the virtual dressing system provides for remote interaction with the virtual dressing system and hence with the renditions on the interactive full-length display panel via a user device such as the ubiquitous smartphone or renders a representation of a user in outfits from a virtual wardrobe right on a display screen in the user device.

In one or more embodiments, related systems comprise circuitry and/or programming for effecting the methods disclosed herein; the circuitry and/or programming can be any combination of hardware, software, and/or firmware configured to affect the methods disclosed herein depending upon the design choices of the system designer. Also, various structural elements can be employed depending on the design choices of the system designer.

BRIEF DESCRIPTION OF THE DRAWINGS

The foregoing summary, as well as the following detailed description of the invention, is better understood when read in conjunction with the appended drawings. For the purpose of illustrating the invention, exemplary constructions of the invention are shown in the drawings. However, the invention is not limited to the specific methods and components disclosed herein. The description of a method step or a component referenced by a numeral in a drawing is applicable to the description of that method step or component shown by that same numeral in any subsequent drawing herein.

DETAILED DESCRIPTION OF THE INVENTION

Figure 1:
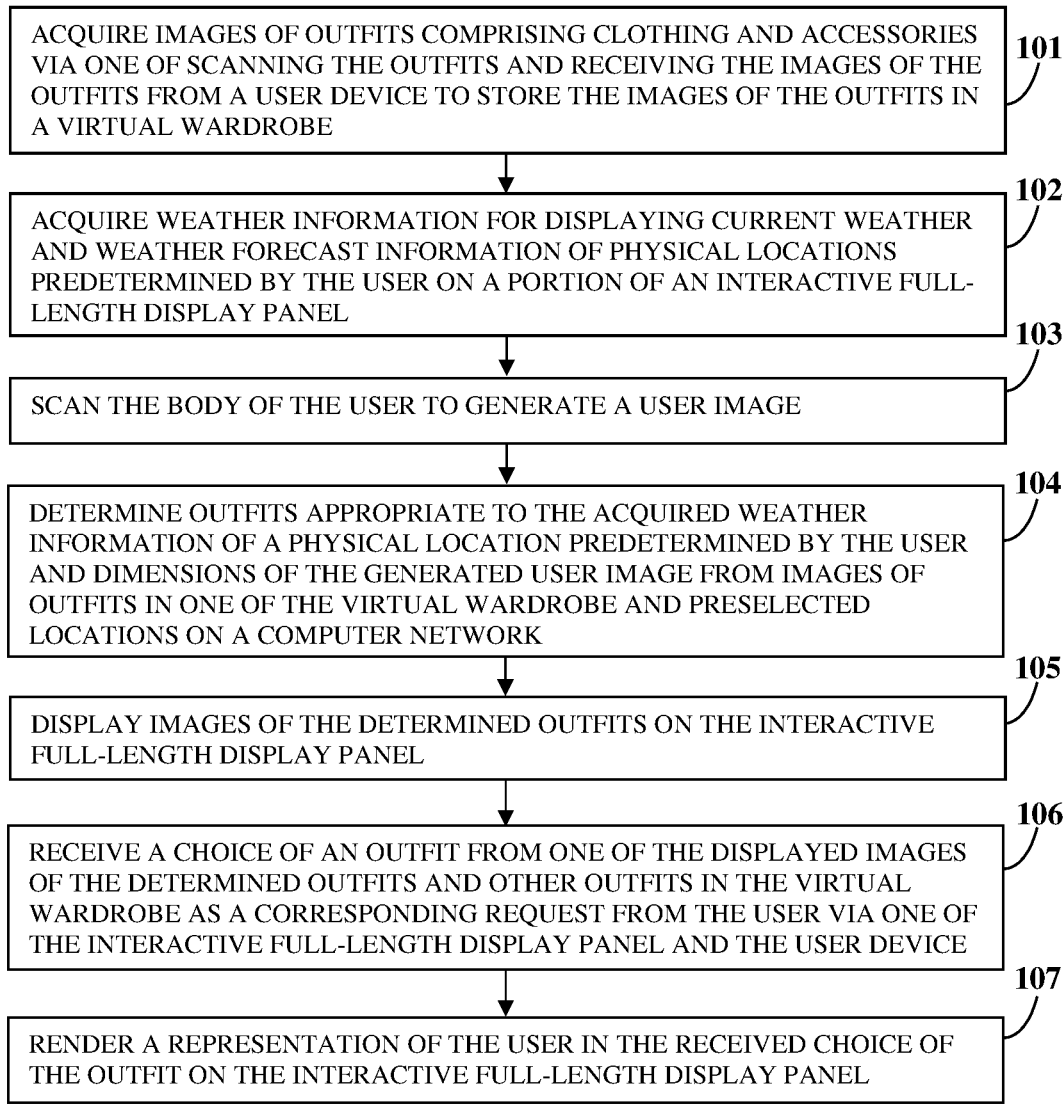
FIG. 1 illustrates a method for rendering a representation of a user in outfits from a virtual wardrobe.

Disclosed herein is a method and a virtual dressing system for rendering a representation of a user in outfits from a virtual wardrobe. The method disclosed herein employs a system comprising at least one processor configured to execute computer program instructions defined by the virtual dressing system for rendering a representation of a user in outfits from a virtual wardrobe. As used herein, a "virtual wardrobe" refers to a customizable wardrobe-like presentation of a collection of images of outfits comprising images of clothing and accessories that is implemented on a non-transitory computer readable storage medium, hereinafter referred to as a memory unit, that is configured to store computer program instructions and data defined by a virtual dressing system. The virtual wardrobe comprises virtual representations of real outfits stored in a wardrobe, for example, a personal wardrobe of the user in the user's home. The outfits that the virtual dressing system renders comprise the user's outerwear, innerwear, and accessories such as purses, shoes, headgear, jewelry, and makeup. The outfits comprise mixing and matching of items of clothing with items of accessories. As used herein, "non-transitory computer readable storage medium" refers to all computer readable media, for example, non-volatile media, volatile media, and transmission media, except for a transitory, propagating signal. Non-volatile media comprise, for example, solid state drives, optical discs or magnetic disks, and other persistent memory volatile media comprising a dynamic random-access memory (DRAM), which typically constitutes a main memory. Volatile media comprise, for example, a register memory, a processor cache, a random-access memory (RAM), etc. Transmission media comprise, for example, coaxial cables, copper wire, fiber optic cables, modems, etc., comprising wires that constitute a system bus coupled to a processor.

The method and the virtual dressing system enable a user to scan the user's body using a camera to generate a user image and then allow the user to virtually try outfits on the generated user image through intuitive interactions with the virtual dressing system, for example, by swiping on a touchscreen display for or selecting, via buttons, various clothing items and accessories. The system is accessible for interaction with the user through input devices, for example, a keyboard such as an alphanumeric keyboard, a joystick, a pointing device such as a computer mouse, a touch pad, a digital pen, a microphone for providing voice input, a digital camera, a physical button, a touch sensitive display device, a track ball, a pointing stick, any device capable of sensing a tactile input, etc., activated by touch and/or voice commands. The method and the virtual dressing system render a representation of the user in the outfits on an interactive full-length display panel that can display the entire length of a user of average height, in an embodiment, to scale. The method and the virtual dressing system enable the user to see what he or she may look like in different outfits without physically donning or changing the outfits.

Furthermore, the method and the virtual dressing system comprise a weather feature, allowing a user to view current weather as well as weekly forecast in local areas and around the world. The virtual dressing system displays current weather and weather forecast information of physical locations predetermined by the user on a portion of the interactive full-length display panel. This feature will assist users in planning ahead for dressing and making sure they dress appropriately for the weather. In addition to the weather feature that will assist the user in planning for an outfit, the method and the virtual dressing system comprise an algorithm that chooses outfits for the user that are appropriate for the weather automatically. Moreover, the method and the virtual dressing system enable the user to upload their outfits and rendered representations of the user in outfits directly to social media. Furthermore, the method and the virtual dressing system create an individual profile for a user that comprises all interaction of the user with the virtual dressing system. Thereby, multiple users can utilize the method and the virtual dressing system using the same hardware, namely, the camera, the interactive full-length display panel, and computing medium by accessing their individual profiles to view and interact with their virtual wardrobes, their outfits, and their rendered representations in the outfits.

FIG. 1 illustrates a method for rendering a representation of a user in outfits from a virtual wardrobe. The virtual dressing system acquires 101 images of outfits comprising clothing and accessories via scanning the outfits or receiving the images of the outfits from a user device and stores the images of the outfits in a virtual wardrobe. As used herein, a "user device" refers to an electronic device, for example, a personal computer, a tablet computing device, a mobile computer, a mobile phone, a smart phone, a portable computing device, a laptop, a personal digital assistant, a wearable device such as the Google Glass® of Google Inc., the Apple Watch® of Apple Inc., etc., a touch centric device, a workstation, a server, a client device, a portable electronic device, a network enabled computing device, an interactive network enabled communication device, a gaming device, a set top box, a television, an image capture device, a portable media player, a theater system, any entertainment system, any other suitable computing equipment, combinations of multiple pieces of computing equipment, etc. In an embodiment, the electronic device is a hybrid device that combines the functionality of multiple devices. Examples of a hybrid electronic device comprise a cellular telephone that comprises media player functionality, a gaming device that comprises a wireless communications capability, a cellular telephone that comprises game and electronic mail (email) functions, and a portable device that receives email, supports mobile telephone calls, has music player functionality, and supports web browsing. In an embodiment, computing equipment is used to implement applications such as media playback applications, for example, iTunes® from Apple Inc., a web browser, a mapping application, an electronic mail (email) application, a calendar application, etc. In another embodiment, computing equipment, for example, one or more servers are associated with one or more online services. In the embodiments, the applications and online services connect to the virtual dressing system via wired or wireless connections for interaction with the virtual dressing system. In an embodiment, the user device has an implementation of a software application comprising modules of the virtual dressing system. Through the software application, the virtual dressing system receives images of outfits from the user device. In another embodiment, the virtual dressing system receives images of outfits from the user device through file sharing from other software applications via the wired or the wireless connections between the system and the user device. In an embodiment, the software application periodically synchronizes with the virtual dressing system to obtain an update of the images of outfits in the user's wardrobe that are updated on the virtual wardrobe.

The virtual dressing system uses a camera capable of capturing high resolution images to scan outfits comprising clothing and accessories when the outfits are held in view of the camera and a user request is provided to the virtual dressing system to initiate a scan. In an embodiment, the virtual dressing system receives user requests through interactions of the user with the interactive full-length display panel that houses one or more of the aforementioned input devices. In the embodiment, the interactive full-length display panel houses the virtual dressing system, the camera, the input devices for the user to interact with the virtual dressing system, the memory unit, and a processor configured to execute the computer program instructions defined by the modules of the virtual dressing system. In another embodiment, the virtual dressing system receives input comprising user requests via a software application on a user device, wherein the software application on the user device comprises modules of the virtual dressing system. In yet another embodiment, the virtual dressing system receives user requests from the user device through remote connections to the virtual dressing system enabled through an application programming interface provided by the virtual dressing system for use in third-party software applications on the user device that connect to the virtual dressing system via a wired or a wireless connection.

The virtual dressing system acquires 102 weather information for displaying current weather and weather forecast information of physical locations predetermined by the user on a portion of the interactive full-length display panel. The user interacts with the virtual dressing system to set it up according to preferences of the user using one or more of the input devices. The virtual dressing system saves the physical locations that the user selects, in the memory unit. In an embodiment, the virtual dressing system acquires the weather information comprising the current weather and the weather forecast for the saved physical locations from a weather service provider through the Internet. The virtual dressing system also receives preferences of the user corresponding to the portion of the interactive full-length display panel on which the virtual dressing system displays the acquired weather information. The virtual dressing system scans 103 the body of the user using the camera to generate a user image. The virtual dressing system stores the generated user image in the memory unit.

The virtual dressing system selects 104 outfits appropriate for the acquired weather information of a physical location selected by the user, and dimensions of the generated user image from images of outfits in the virtual wardrobe or in preselected locations on a computer network. In addition to the weather feature that will assist the user in planning for an outfit, the method and the virtual dressing system comprises an algorithm that chooses outfits for the user that are appropriate for the weather automatically. The virtual dressing system selects the appropriate outfits using an algorithm that incorporates artificial intelligence to determine material used in the outfits to a programmed degree of accuracy through image recognition. The algorithm is programmed to train on known images of clothing and accessories with corresponding details to aid in the recognition of outfits that would be appropriate for certain weather conditions. For example, when snow is forecast for the day, the virtual dressing system suggests layers of clothing starting from innerwear to outer jackets that help keep the user warm. In an example, the virtual dressing system also suggests gloves, snowshoes, face masks, balaclavas, neck-warmers, scarves, etc. as accessories in the outfit. The virtual dressing system further takes into account color matching and suitable styles to suggest clothing items and accessories that complement each other to form a suitable outfit. Moreover, the virtual dressing system obtains sizes of the clothing and the accessories if already present as details, for example, in metadata, associated with the images of the outfits. If the information about the sizes is not readily available, the virtual dressing system uses the algorithm to obtain the sizes as measurements through image recognition from the images of the outfits. The virtual dressing system obtains the dimensions of the generated user image using the same algorithm. The virtual dressing system compares the obtained size information of the outfits to the obtained dimensions of the generated user image to determine if the clothing and accessories fit the user.

As a first preference, the virtual dressing system selects appropriate outfits from the virtual wardrobe that has images of outfits saved from scanning of the outfits, or the reception of the images of the outfits from a user device. When a selection of a predetermined number of suitable outfits is not available or when certain clothing items or accessories are either not present or do not match other selected clothing items or accessories in terms of size, color, etc., the virtual dressing system suggests outfits from the preselected locations on the computer network. The virtual dressing system uses the algorithm comprising artificial intelligence to train on programmed rules of good matching practices of clothing and accessories in terms of color, sizes, compatibility with each other, prevailing styles of fashion, etc., to determine if the clothing and accessories go well with each other in an outfit. The programmed rules comprise images and details about objects in the images, for example, as metadata, to serve as examples that the algorithm uses to practice image recognition on, thereby engaging machine learning and artificial intelligence in the determination of the appropriate outfits for the user on any particular day. The preferences of the user that the virtual dressing system receives also comprises the preselected locations on a computer network. The computer network is, for example, the internet, an intranet, a wired network, a wireless network, a communication network that implements Bluetooth® of Bluetooth Sig, Inc., a network that implements Wi-Fi® of Wi-Fi Alliance Corporation, an ultra-wideband communication network (UWB), a wireless universal serial bus (USB) communication network, a communication network that implements ZigBee® of ZigBee Alliance Corporation, a general packet radio service (GPRS) network, a mobile telecommunication network such as a global system for mobile (GSM) communications network, a code division multiple access (CDMA) network, a third generation (3G) mobile communication network, a fourth generation (4G) mobile communication network, a fifth generation (5G) mobile communication network, a long-term evolution (LTE) mobile communication network, etc., a local area network, a wide area network, an internet connection network, an infrared communication network, etc., or a network formed from any combination of these networks. The virtual dressing system selects outfits appropriate to the acquired weather information of the physical location predetermined by the user and the dimensions of the generated user image, and that are not available in a predetermined number or as a match to other selected items of clothing or accessories in the outfits from images of outfits in the preselected locations on the computer network.

The virtual dressing system displays 105 images of the selected outfits on the interactive full-length display panel. The virtual dressing system also displays interface elements on the interactive full-length display panel to allow the user of the virtual dressing system to skim through, select, and otherwise interact with the displayed images of the outfits using input devices provided on the interactive full-length display panel or through input devices on a user device communicatively coupled to the virtual dressing system. Moreover, the virtual dressing system provides the user access to the virtual wardrobe to select an outfit from the virtual wardrobe in case the user is not satisfied with any of the outfits selected by the virtual dressing system to be appropriate for the weather conditions and the dimensions of the generated user image. For outfits that the virtual dressing system suggests from the preselected locations on the computer network, the virtual dressing system provides additional information that enables the user to obtain the outfits. For example, the virtual dressing system displays information of locations, online through the computer network or offline through physical locations, from which the outfits can be procured, current availability of the outfits, prices for renting or purchasing the items of clothing and accessories in the outfits, sizes of the items of clothing and accessories, and where available, direct access to sellers of the items of clothing and accessories in the outfits, etc.

The virtual dressing system receives 106 a choice of an outfit from the displayed images of the computer selected outfits or other outfits in the virtual wardrobe as a corresponding request from the user via the interactive full-length display panel or the user device. The virtual dressing system receives the request from the user through input devices on the interactive full-length display panel or the user device via a wired or a wireless connection. The virtual dressing system saves the choice of an outfit received from the user in a section of the virtual wardrobe on receiving a corresponding request from the user via the interactive full-length display panel or the user device. The user can browse through previous choices of outfits made by the user at a later time to either reselect those outfits or to keep track of outfits worn previously. In an embodiment, when the outfits chosen by the user are saved in the virtual wardrobe, the virtual dressing system notifies the user of a date on which a particular outfit was chosen for wear on a subsequent selection of the outfit by the user, thereby helping the user, for example, to decide if the outfit has been worn too recently to be worn again. Furthermore, the virtual dressing system manages storage space in a memory unit on which the virtual wardrobe is implemented by using only references to images of items of clothing and accessories in the saved choices of outfits that are already present in the virtual wardrobe as opposed to saving the images again, thereby saving space required for storage in the memory unit.

The virtual dressing system renders 107 a representation of the user in the received choice of the outfit on the interactive full-length display panel. The virtual dressing system renders the representation of the user such that a resulting image on the interactive full-length display panel portrays the user as if the resulting image was that of the user physically wearing the outfit. In an embodiment, the virtual dressing system superimposes images of the outfits on the generated user image to render the representations of the user in the outfits. In another embodiment, the virtual dressing system renders the representation by continuously scanning the body of the user to capture the user's movements and continuously updating the rendered representation of the user in an outfit to correctly position the images of the outfit on the image of the user generated in real time. In this embodiment, the user is able to turn or move limbs to see how the outfit looks on the user in various positions of the user. In this embodiment, the virtual dressing system uses algorithms realizing augmented reality to render the representation of the user in the received choice of the outfit in real time on the interactive full-length display panel. In an embodiment, the virtual dressing system updates the rendered representation of the user on receiving a choice of a different outfit as a corresponding request from the user via the interactive full-length display panel or the user device. The virtual dressing system updates the rendition using the next outfit chosen by the user from the displayed images of the selected outfits or other outfits in the virtual wardrobe. In an embodiment, the virtual dressing system uses the algorithm comprising artificial intelligence and machine learning to learn from choices of outfits made by the user to deduce types of outfits preferred by the user in correlation with time of the year and day of the week. The virtual dressing system improves on the selection of outfits appropriate to the acquired weather information and dimensions of the generated user image to provide suggestions of outfits from images of outfits in the virtual wardrobe and in preselected locations on the computer network that are increasingly in line with the user's preferences.

The virtual dressing system stores an individual profile for the user comprising the generated user image, the virtual wardrobe, and user preferences in the memory unit, thereby providing for utilization of the interactive full-length display panel by multiple users each with a separate individual profile. The user preferences comprise information of physical locations for which weather is sought, user-selected locations on a computer network from which the virtual dressing system selects appropriate outfits, number of suitable outfits to be displayed by the virtual dressing system on selection of appropriate outfits for the user, social media information provided by the user, and choices of outfits and rendered representations of the user that the user requests the virtual dressing system to save. In an embodiment, the virtual dressing system also stores under user preferences any information that the virtual dressing system learns from the interactions of the user with it through machine learning and artificial intelligence processes engaged by the algorithm used by the virtual dressing system. Consequently, multiple users can use the virtual dressing system using the same camera and on a single interactive full-length display panel with a separate individual profile for each user. Moreover, the virtual dressing system, on receiving a request from the user via the interactive full-length display panel or the user device, uploads user-selected rendered representations of the user and the images of the outfits in the virtual wardrobe to social media. The virtual dressing system uploads to social media via its connection to the Internet using social media information provided by the user as part of the user preferences.

In an embodiment, a user can scan outfits comprising clothing items and accessories and scans the body of the user via a camera on a user device, for example, a smartphone or the camera in the system comprising the virtual dressing system. The user can save a user image generated from the scan of the body of the user in the virtual dressing system and save images of the outfits in the virtual wardrobe of the virtual dressing system. Once saved, the user can browse through his or her virtual wardrobe to select outfits to be donned on the generated user image. In an embodiment, the virtual dressing system provides the user the option of saving outfits chosen by the user from the virtual wardrobe in, for example, a "my outfits" section in the virtual wardrobe for subsequent easy retrieval at a later time. In another embodiment, the system is implemented entirely on a user device, for example, a smartphone or a tablet computer, using a camera on the user device for scanning, a touch-enabled display screen on the user device as the interactive full-length display panel displaying a scaled version of the full-length representations of the user in virtual outfits, a memory unit, and a processor on the user device for implementing the system. In this embodiment, the programmed user device functions as a portable compact system for rendering a representation of a user in outfits from a virtual wardrobe.

Figure 2:
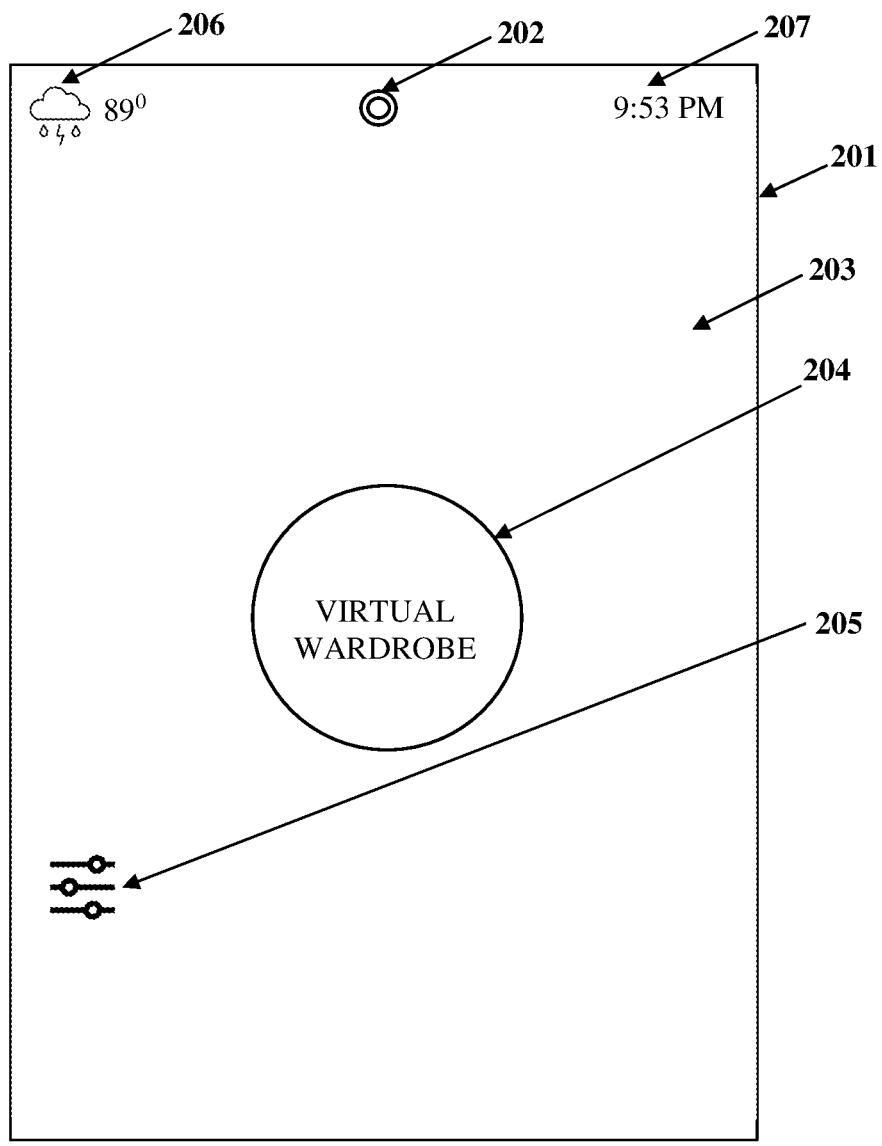
FIG. 2 exemplarily illustrates an embodiment of an interactive full-length display panel that is a part of a system for rendering a representation of a user in outfits from a virtual wardrobe.

FIG. 2 exemplarily illustrates an embodiment of an interactive full-length display panel 201 that is a part of a system for rendering a representation of a user in outfits from a virtual wardrobe. The interactive full-length display panel 201 is a display panel that can display the entire length of a user of average height as disclosed in the detailed description of FIG. 1. In an embodiment illustrated, the interactive full-length display panel 201 displays the entire length of a user of average height to scale. Accordingly, the display panel 201 is between 4 feet and 6 feet in length, and between 2 feet and 3 feet in width. The interactive full-length display panel 201 has a camera 202 built into it. The camera 202 is used to scan outfits comprising clothing and accessories for capturing high resolution images of the outfits and to scan the body of a user for generating a user image in response to corresponding requests from the user as disclosed in the detailed description of FIG. 1. In an embodiment, the interactive full-length display panel 201 comprises a touchscreen 203 throughout a front side of its surface that serves as an input device for a user to interact with the virtual dressing system as disclosed in the detailed description of FIG. 1. The virtual dressing system displays relevant interface elements on the touchscreen 203 for the user to interact with the virtual dressing system at corresponding stages of the execution of the method disclosed in the detailed description of FIG. 1. For example, the virtual dressing system displays animated navigation arrows indicating swiping directions for navigating through outfits in the virtual wardrobe and animated virtual selection buttons for customizing an outfit by mixing and matching items of clothing and accessories.

A virtual wardrobe button 204 for accessing the virtual wardrobe is shown in the middle and a virtual settings button 205 is shown on the lower left portion of the interactive full-length display panel 201. A user touches the virtual settings button 205 to provide user preferences to the virtual dressing system, where the user preferences are as disclosed in the detailed description of FIG. 1. The interactive full-length display panel 201 shows weather information display 206 on the top left portion and current local time display 207 on the top right portion, where the weather information display 206 is shown according to the user preferences as disclosed in the detailed description of FIG. 1. In the embodiment, the interactive full-length display panel 201 is positioned on the floor in the same manner as a standard full-length standing mirror with a frame. In an embodiment, the interactive full-length display panel 201 is intended to function as a full-length standing mirror albeit virtually without the user having to physically change outfits to check fit and suitability of the outfits.

Figure 3:
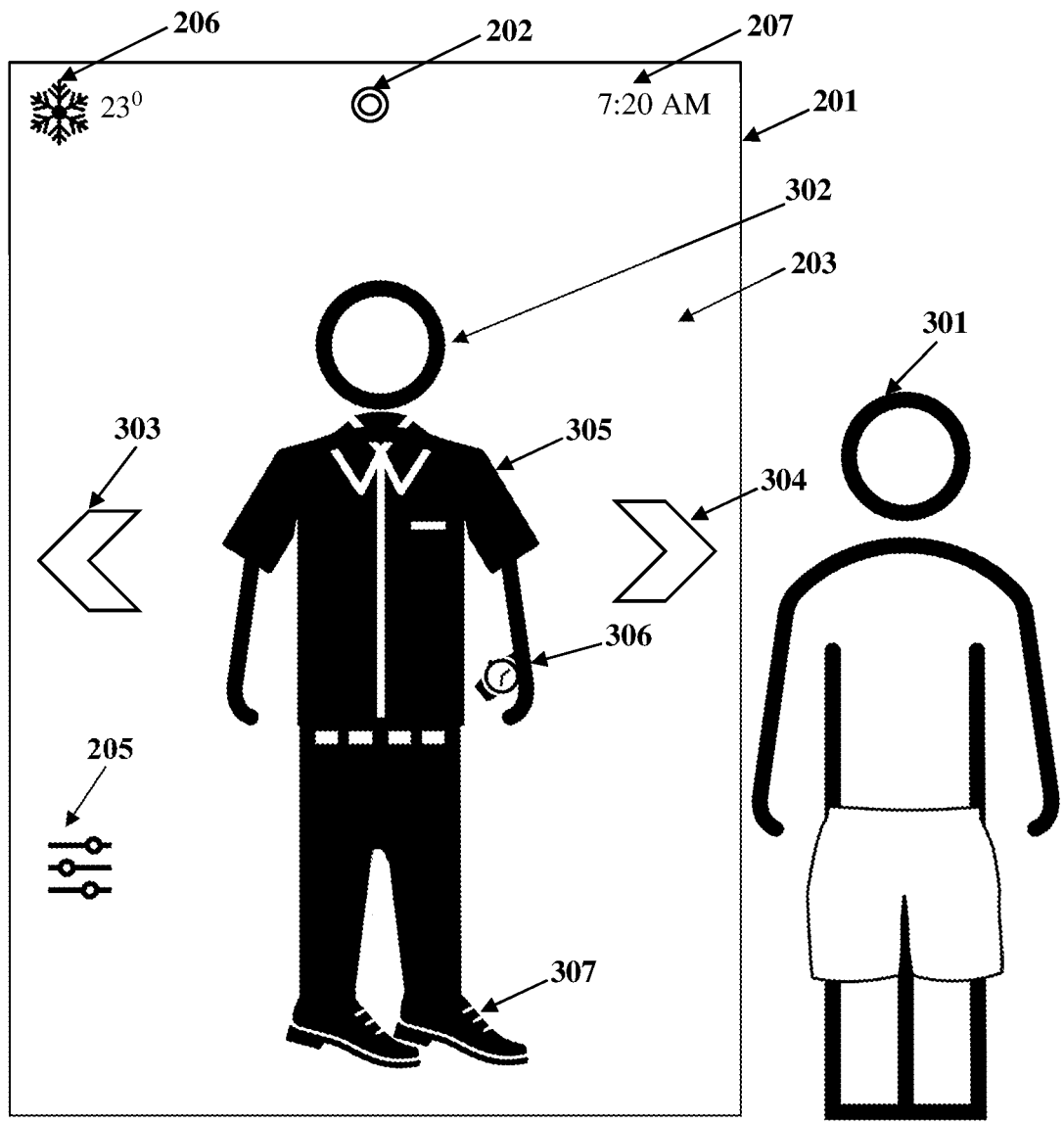
FIG. 3 exemplarily illustrates a rendition of a representation of a user on an embodiment of an interactive full-length display panel in an outfit chosen by the user.

FIG. 3 exemplarily illustrates a rendition of a representation of a user on an embodiment of an interactive full-length display panel in an outfit chosen by the user. The interactive full-length display panel 201, with the camera 202, touchscreen 203, weather information display 206, and the current local time display 207, is as disclosed in the detailed description of FIG. 2. A user 301 interacts with the virtual dressing system using the touchscreen 203 of the interactive full-length display panel 201 to virtually try on an outfit. The virtual dressing system renders a representation 302 of the user 301 in an outfit on the interactive full-length display panel 201. The virtual dressing system renders the representation 302 on receiving a choice of an outfit from displayed images of selected outfits or other outfits in the virtual wardrobe as a corresponding request from the user 301 via the interactive full-length display panel 201 as disclosed in the method in the detailed description of FIG. 1. The virtual dressing system displays images of the other selected outfits on the interactive full-length display panel 201 on receiving corresponding user interactions. The virtual dressing system also displays interface elements on the interactive full-length display panel 201 to allow the user of the virtual dressing system to interact with the displayed images of the outfits using the touchscreen 203 of the interactive full-length display panel 201 as disclosed in the detailed description of FIG. 1. As exemplarily illustrated, the user 301 can use a left navigation arrow 303 and a right navigation arrow 304 on the touchscreen 203 to choose a different outfit. The rendered representation 302 comprises clothing items 305 and a watch 306 and shoes 307 as accessories of the outfit.

Figure 4:
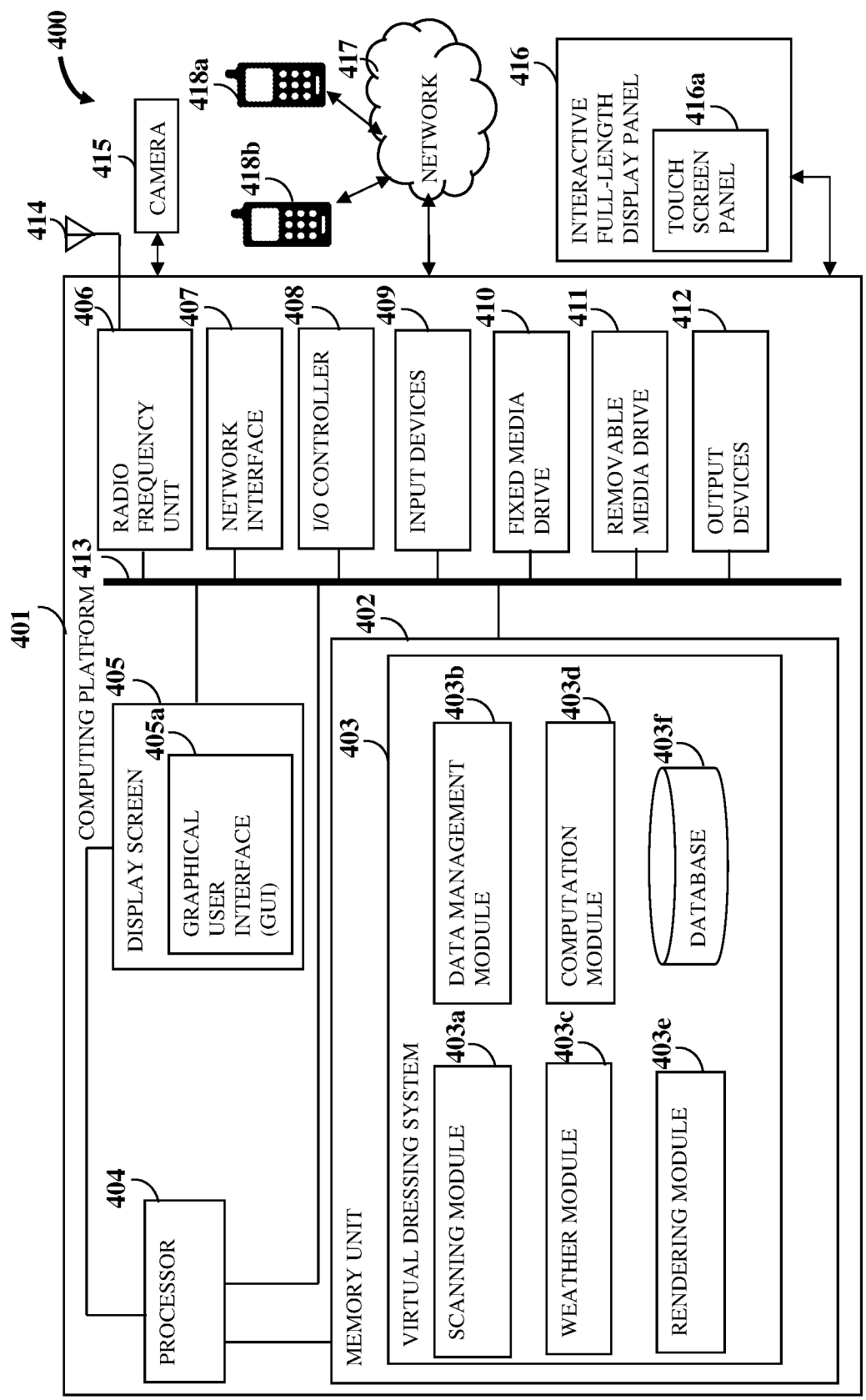
FIG. 4 exemplarily illustrates a system 400 for rendering a representation of a user in outfits from a virtual wardrobe.

FIG. 4 exemplarily illustrates a system 400 for rendering a representation of a user in outfits from a virtual wardrobe. The system 400 disclosed herein comprises the virtual dressing system 403. The virtual dressing system 403 is implemented on a computing platform 401, which is an electronic device, for example, a personal computer, a tablet computing device, a mobile computer, a portable computing device, a laptop, a touch device, a workstation, a server, portable electronic device, a network enabled computing device, an interactive network enabled communication device, any other suitable computing equipment, combinations of multiple pieces of computing equipment, etc. In an embodiment, the computing equipment is used to implement applications such as media playback applications, a web browser, an electronic mail (email) application, a calendar application, etc., with one or more servers associated with one or more online services. The system 400 comprises a camera 415 that captures high resolution images for scanning outfits comprising clothing and accessories and the body of the user. The system 400 further comprises an interactive full-length display panel 416 that displays the entire length of a user of average height. The virtual dressing system 403 renders the representation of a user in outfits from a virtual wardrobe on the interactive full-length display panel 416. In an embodiment, the interactive full-length display panel 416 comprises a touchscreen panel 416a on an entire side of its surface for the user to interact with the virtual dressing system 403 through touch interactions with the touchscreen panel 416a. The network 417 is the computer network disclosed in the detailed description of FIG. 1. The network 417 can be a wired, a wireless, or a combination of networks using different protocols. An antenna 414 allows the system 400 to connect to a wireless network. In another embodiment, instead of the users interacting with the virtual dressing system 403 through the touchscreen panel 416a on the interactive full-length display panel 416, the virtual dressing system 403 is accessible to users, for example, through a broad spectrum of technologies and devices such as cellular phones, tablet computing devices, etc., with access to the Internet.

As exemplarily illustrated, the system 400 comprises a non-transitory computer readable storage medium, for example, a memory unit 402 for storing programs and data, and at least one processor 404 communicatively coupled to the non-transitory computer readable storage medium. The non-transitory computer readable storage medium is as disclosed in the detailed description of FIG. 1. The non-transitory computer readable storage medium stores computer program instructions defined by modules, for example, 403a, 403b, 403c, 403d, 403e, etc., of the virtual dressing system 403. The virtual dressing system 403 is installed and stored in the memory unit 402 of the system 400. The memory unit 402 is used for storing program instructions, applications, and data. The memory unit 402 is, for example, a random-access memory (RAM) or another type of dynamic storage device that stores information and instructions for execution by the processor 404. The virtual wardrobe is implemented as a customizable wardrobe-like presentation of a collection of images of outfits comprising images of clothing and accessories in the memory unit 402 as disclosed in the detailed description of FIG. 1. The memory unit 402 also stores temporary variables and other intermediate information used during execution of the instructions by the processor 404. The virtual dressing system 403 further comprises a read only memory (ROM) or another type of static storage device that stores static information and instructions for the processor 404.

The virtual dressing system 403 comprises a scanning module 403a, a data management module 403b, a weather module 403c, a computation module 403d, a rendering module 403e, and one or more databases 403f stored in the memory unit 402. The databases 403f of the virtual dressing system 403 can be any storage area or medium that can be used for storing data and files. In an embodiment, the databases 403f can be, for example, any of a structured query language (SQL) data store or a not only SQL (NoSQL) data store such as the Microsoft® SQL Server®, the Oracle® servers, the MySQL® database of MySQL AB Limited Company, the mongoDB® of MongoDB, Inc., the Neo4j graph database of Neo Technology Corporation, the Cassandra database of the Apache Software Foundation, the HBase™ database of the Apache Software Foundation, etc. In another embodiment, the databases 403f can also be a location on a file system. In another embodiment, the databases 403f can be remotely accessed by the virtual dressing system 403 via the network 417. In another embodiment, the databases 403f are configured as cloud-based databases implemented in a cloud computing environment, where computing resources are delivered as a service over a network, for example, the internet. As used herein, "cloud computing environment" refers to a processing environment comprising configurable computing physical and logical resources, for example, networks, servers, storage, applications, services, etc., and data distributed over the network 417. The cloud computing environment provides on-demand network access to a shared pool of the configurable computing physical and logical resources. In an embodiment, the virtual dressing system 403 is a cloud-computing-based platform implemented as a service for rendering a representation of a user in outfits from a virtual wardrobe. The virtual dressing system 403 is developed, for example, using the Google App engine cloud infrastructure of Google Inc., Amazon Web Services® of Amazon Technologies, Inc., the Amazon elastic compute cloud EC2® web service of Amazon Technologies, Inc., the Google® Cloud platform of Google Inc., the Microsoft® Cloud platform of Microsoft Corporation, etc.

The processor 404 executes the computer program instructions defined by the virtual dressing system 403. The processor 404 refers to any microprocessors, central processing unit (CPU) devices, finite state machines, computers, microcontrollers, digital signal processors, logic, a logic device, a user circuit, an application specific integrated circuit (ASIC), a field-programmable gate array (FPGA), a chip, etc., or any combination thereof, capable of executing computer programs or a series of commands, instructions, or state transitions. In an embodiment, the processor 404 is implemented as a processor set comprising, for example, a programmed microprocessor and a math or graphics co-processor. The processor 404 is selected, for example, from the Intel® processors such as the Itanium® microprocessor or the Pentium® processors, Advanced Micro Devices (AMD®) processors such as the Athlon® processor, Ultra-SPARC® processors, microSPARC® processors, HP® processors, International Business Machines (IBM®) processors such as the PowerPC® microprocessor, the MIPS® reduced instruction set computer (RISC) processor of MIPS Technologies, Inc., RISC based computer processors of ARM Holdings, Motorola® processors, Qualcomm® processors, etc. The virtual dressing system 403 disclosed herein is not limited to employing a processor 404. In an embodiment, the virtual dressing system 403 employs a controller or a microcontroller. The processor 404 executes the modules, for example, 403a, 403b, 403c, 403d, 403e, etc., of the virtual dressing system 403.

As exemplarily illustrated, the system 400 further comprises a display screen 405, on which, a graphical user interface (GUI) 405a is displayed for a user to interact with the computing platform 401, a data bus 413, a radio frequency unit 406, a network interface 407, an input/output (I/O) controller 408, input devices 409, a fixed media drive 410 such as a hard drive, a removable media drive 411 for receiving removable media, and output devices 412. In an embodiment, instead of the display screen 405 being in the the computing platform 401, the display screen 405 is the interactive full-length display panel 416 on which the virtual dressing system 403 renders a representation of the user in outfits from a virtual wardrobe and the graphical user interface (GUI) 405a is displayed on the touchscreen panel 416a of the interactive full-length display panel 416. In an embodiment, the camera, and the computing platform 401 and all components within are implemented in the interactive full-length display panel 416, wherein the virtual dressing system 403 is implemented in the interactive full-length display panel 416, making the interactive full-length display panel 416 a stand-alone unit that a user can interact with using the touchscreen panel 416a for rendering a representation of the user in outfits from a virtual wardrobe. However, in the embodiment exemplarily illustrated, a user can interact with the virtual dressing system 403 either through the input devices 409 in the computing platform 401 with visual feedback of the interactions on the graphical user interface (GUI) 405a of the display screen 405, through the touchscreen panel 416a on the interactive full-length display panel 416 with the visual feedback of the interactions on the interactive full-length display panel 416 itself, or through other user devices 418a and 418b via the network 417 using the network interface 407 with the visual feedback of the interactions on a display screen of the user devices 418a and 418b or on the interactive full-length display panel 416. The network interface 407 enables connection of the virtual dressing system 403 in the system 400 to the network 417. In an embodiment, the network interface 407 is provided as an interface card also referred to as a line card. The network interface 407 comprises, for example, of an infrared (IR) interface, an interface implementing Wi-Fi® of Wi-Fi Alliance Corporation, a universal serial bus (USB) interface, a FireWire® interface of Apple Inc., an Ethernet interface, a frame relay interface, a cable interface, a digital subscriber line (DSL) interface, a token ring interface, a peripheral controller interconnect (PCI) interface, a local area network (LAN) interface, a wide area network (WAN) interface, interfaces using serial protocols, interfaces using parallel protocols, Ethernet communication interfaces, asynchronous transfer mode (ATM) interfaces, a high speed serial interface (HSSI), a fiber distributed data interface (FDDI), interfaces based on transmission control protocol (TCP)/internet protocol (IP), interfaces based on wireless communications technology such as satellite technology, radio frequency (RF) technology, near field communication, etc. The I/O controller 408 controls input actions and output actions performed by the virtual dressing system 403.

The scanning module 403a scans outfits comprising clothing and accessories via the camera 415. Moreover, the scanning module 403a scans the body of a user via the camera 415 to generate a user image. The data management module 403b receives images of outfits from a user device, for example, the user devices 418a and 418b via the network 417, to store the received images of the outfits and images of the scanned outfits in a virtual wardrobe on the non-transitory computer readable storage medium. The outfits comprise mixing and matching of items of clothing with items of accessories. The weather module 403c acquires weather information comprising current weather and weather forecast information of physical locations predetermined by the user. The computation module 403d selects outfits appropriate to the acquired weather information of a physical location predetermined by the user and dimensions of the generated user image from images of outfits in the virtual wardrobe or preselected locations on a computer network, for example, computers connected to the virtual dressing system 403 through the network 417. The rendering module 403e displays images of the computer selected outfits on the interactive full-length display panel 416. Moreover, the rendering module 403e displays the weather information acquired by the weather module 403c on a portion of the interactive full-length display panel 416. The data management module 403b also receives a user request comprising a choice of an outfit from one of the displayed images of the selected outfits and other outfits in the virtual wardrobe via the interactive full-length display panel 416 or the user device, for example, one of the user devices 418a and 418b. The rendering module 403e renders a representation of the user in the received choice of the outfit on the interactive full-length display panel 416. The rendering module 403e updates the rendered representation of the user on reception by the data management module 403b of a choice of a different outfit as a corresponding request from the user via the interactive full-length display panel 416 or the user device, for example, one of the user devices 418a and 418b.

The data management module 403b also saves the choice of an outfit received from the user in a section of the virtual wardrobe on receiving a corresponding request from the user via the interactive full-length display panel 416 or the user device, for example, one of the user devices 418a and 418b. The data management module stores an individual profile for the user comprising the generated user image, the virtual wardrobe and user preferences on the non-transitory computer readable storage medium, thereby providing for utilization of the interactive full-length display panel 416 by multiple users each with a separate individual profile. Consequently, multiple users using different user devices, for example, users of the user devices 418a and 418b, can interact with the virtual dressing system 403, for example, via the network 417, for rendering a representation of the users, one at a time, in outfits from a virtual wardrobe through their individual profiles. Furthermore, the data management module 403b uploads a selection of the rendered representation of the user and the images of the outfits in the virtual wardrobe to social media on receiving a corresponding request from the user via the interactive full-length display panel 416 or the user device, for example, one of the user devices 418a and 418b.

The display screen 405 and the interactive full-length display panel 416 comprise, for example, a video display, a liquid crystal display, a plasma display, an organic light emitting diode (OLED) based display, etc. The input devices 409 are used for inputting data into the virtual dressing system 403. A user uses the input devices 409 to input data to the virtual dressing system 403. For example, the user can interact with the virtual dressing system 403 using other user devices 418a and 418b through the network 417, interact with the virtual dressing system 403 on a user interface rendered by the virtual dressing system 403 on the touchscreen panel 416a on the interactive full-length display panel 416, etc. The user devices 418a and 418b and the input devices 409 are disclosed in the detailed description of FIG. 1.

Computer applications and programs are used for operating the virtual dressing system 403. The programs are loaded onto the fixed media drive 410 and into the memory unit 402 of the system 400 via the removable media drive 411. In an embodiment, the computer applications and programs may be loaded directly on the system 400 via the network 417. The output devices 412 output the results of operations performed by the virtual dressing system 403. For example, the virtual dressing system 403 renders a representation of the user in outfits from the virtual wardrobe using the output devices 412 to connect to the interactive full-length display panel 416.

The processor 404 executes an operating system, for example, the Linux® operating system, the Unix® operating system, any version of the Microsoft® Windows® operating system, the Mac OS of Apple Inc., the IBM® OS/2, VxWorks® of Wind River Systems, Inc., QNX Neutrino® developed by QNX Software Systems Ltd., the Palm OS®, the Solaris operating system developed by Sun Microsystems, Inc., the Android® operating system of Google Inc., the Windows Phone® operating system of Microsoft Corporation, the BlackBerry® operating system of BlackBerry Limited, the iOS operating system of Apple Inc., the Symbian™ operating system of Symbian Foundation Limited, etc. The virtual dressing system 403 employs the operating system for performing multiple tasks. The operating system is responsible for management and coordination of activities and sharing of resources of the virtual dressing system 403. The operating system further manages security of the virtual dressing system 403, peripheral devices connected to the virtual dressing system 403, and network connections. The operating system employed on the virtual dressing system 403 recognizes, for example, inputs provided by the user of the system 400 using one of the input devices 409, the output devices 412, files, and directories stored locally on the fixed media drive 410. The operating system on the virtual dressing system 403 executes different programs using the processor 404. The processor 404 and the operating system together define a computer platform for which application programs in high level programming languages are written. The operating system of the system 400 determines the programming languages used in the virtual dressing system 403. For example, the Java® programming language is used for developing the virtual dressing system 403 on the system 400 with an Android® operating system, while Objective-C® of Apple Inc., is used for developing the virtual dressing system 403 on the system 400 with the iOS operating system, and the UNITY® libraries and platforms of Unity IPR ApS, LLC., are used developing the virtual dressing system 403 for both the Android® operating system and the iOS operating system.

The processor 404 retrieves instructions defined by the scanning module 403a, the data management module 403b, the weather module 403c, the computation module 403d, the rendering module 403e, etc., stored in the memory unit 402, for performing respective functions disclosed above. The processor 404 retrieves instructions for executing the modules, for example, 403a, 403b, 403c, 403d, 403e, etc., of the virtual dressing system 403 from the memory unit 402. A program counter determines the location of the instructions in the memory unit 402. The program counter stores a number that identifies the current position in a program of each of the modules, for example, 403a, 403b, 403c, 403d, 403e, etc., of the virtual dressing system 403. The instructions fetched by the processor 404 from the memory unit 402 after being processed are decoded. The instructions are stored in an instruction register in the processor 404. After processing and decoding, the processor 404 executes the instructions, thereby performing processes defined by those instructions.

At the time of execution, the instructions stored in the instruction register are examined to determine the operations to be performed. The processor 404 then performs the specified operations. The operations comprise arithmetic operations and logic operations. The operating system performs multiple routines for performing a number of tasks required to assign the input devices 409, the output devices 412, and the memory unit 402 for execution of the modules, for example, 403a, 403b, 403c, 403d, 403e, etc., of the virtual dressing system 403. The tasks performed by the operating system comprise, for example, assigning memory to the modules, for example, 403a, 403b, 403c, 403d, 403e, etc., of the virtual dressing system 403, and to data used by the virtual dressing system 403, moving data between the memory unit 402 and disk units, and handling input/output operations. The operating system performs the tasks on request by the operations, and after performing the tasks, the operating system transfers the execution control back to the processor 404. The processor 404 continues the execution to obtain outputs. The outputs of the execution of the modules, for example, 403a, 403b, 403c, 403d, 403e, etc., of the virtual dressing system 403 are displayed to the user on the interactive full-length display panel 416 via the output devices 412.

Disclosed herein is also a non-transitory computer readable storage medium that stores computer program codes comprising instructions executable by at least one processor for rendering a representation of a user in outfits from a virtual wardrobe. The computer program codes comprise a first computer program code for acquiring images of outfits comprising clothing and accessories via scanning the outfits or receiving the images of the outfits from a user device, for example, one of the user devices 418a and 418b, to store the images of the outfits in a virtual wardrobe; a second computer program code for acquiring weather information for displaying current weather and weather forecast information of physical locations predetermined by the user on a portion of the interactive full-length display panel 416; a third computer program code for scanning the body of the user to generate a user image; a fourth computer program code for selecting outfits appropriate to the acquired weather information of a physical location predetermined by the user and dimensions of the generated user image from images of outfits in the virtual wardrobe or preselected locations on a computer network, for example, computers connected to the virtual dressing system 403 via the network 417; a fifth computer program code for displaying images of the computer selected outfits on the interactive full-length display panel 416; a sixth computer program code for receiving a choice of an outfit from the displayed images of the computer selected outfits or other outfits in the virtual wardrobe as a corresponding request from the user via the interactive full-length display panel or the user device, for example, one of the user devices 418a and 418b; a seventh computer program code for rendering a representation of the user in the received choice of the outfit on the interactive full-length display panel 416; an eighth computer program code for updating the rendered representation of the user on receiving a choice of a different outfit as a corresponding request from the user via the interactive full-length display panel 416 or the user device, for example, one of the user devices 418a and 418b; a ninth computer program code for saving the choice of an outfit received from the user in a section of the virtual wardrobe on receiving a corresponding request from the user via the interactive full-length display panel 416 or the user device, for example, one of the user devices 418a and 418b; a tenth computer program code for storing an individual profile for the user comprising the generated user image, the virtual wardrobe and user preferences on the non-transitory computer readable storage medium, thereby providing for utilization of the interactive full-length display panel 416 by multiple users each with a separate individual profile; and an eleventh computer program code for uploading a selection of the rendered representation of the user and the images of the outfits in the virtual wardrobe to social media on receiving a corresponding request from the user via the interactive full-length display panel 416 and the user device, for example, one of the user devices 418a and 418b.

The non-transitory computer readable storage medium disclosed herein further stores additional computer program codes for performing additional steps that may be required and contemplated for rendering a representation of a user in outfits from a virtual wardrobe. In an embodiment, a single piece of computer program code comprising computer executable instructions performs steps of the method disclosed herein for rendering a representation of a user in outfits from a virtual wardrobe. The computer program codes comprising computer executable instructions are embodied on the non-transitory computer readable storage medium. The processor 404 of the virtual dressing system 403 retrieves these computer executable instructions and executes them. When the computer executable instructions are executed by the processor 404, the computer executable instructions cause the processor 404 to perform the steps of the method for rendering a representation of a user in outfits from a virtual wardrobe.

In the method disclosed herein, the design and flow of interactions between the virtual dressing system 403 and users of the virtual dressing system 403 is deliberate, designed, and directed. The interactions designed by the virtual dressing system 403 allow the virtual dressing system 403 to acquire images of outfits comprising clothing and accessories via scanning the outfits or receiving the images of the outfits from a user device, acquire weather information of physical locations predetermined by the user, and scan the body of the user. From this information, through the use of another separate and autonomous computer program, the virtual dressing system 403 selects outfits appropriate to the acquired weather information of a physical location predetermined by the user and dimensions of the generated user image from images of outfits in the virtual wardrobe or preselected locations on a computer network. Through the use of another separate and autonomous computer program, the virtual dressing system 403 renders a representation of the user in a received choice of the outfit on the interactive full-length display panel 416. To acquire images of outfits and generate a user image from a process of scanning or from a user device, acquire weather information, select outfits appropriate to the acquired weather information and dimensions of the generated user image from images of outfits, and render a user-chosen outfit on the generated user image, thereby rendering a representation of the user in outfits from a virtual wardrobe requires more than three (3) separate computer programs, the execution of which cannot be easily or manually executed by a user working with a generic computer. A generic computer using a generic program cannot acquire images of outfits and the user's body via a scanning process, select appropriate outfits in accordance with weather information and computed dimensions of the user from the user image, and render a representation of the user in the computer selected outfits or user-chosen outfits in accordance with the method steps disclosed above.

The virtual dressing system 403 uses an algorithm comprising artificial intelligence and machine learning to determine the type of materials, sizes, colors, and other characteristics of outfits in the virtual wardrobe or in preselected locations on a computer network and to learn from choices of outfits made by the user to select the outfits appropriate for the weather in a location and the types of outfits preferred by the user in correlation with time of the year and day of the week as disclosed in the detailed description of FIG. 1. In an embodiment, the virtual dressing system 403 renders the representation of the user in an outfit by continuously scanning the body of the user to capture the user's movements and continuously updating the rendered representation of the user in the outfit in real time as disclosed in the detailed description of FIG. 1. Therefore, the virtual dressing system 403 incorporates intelligence in rendering a representation of the user in outfits from a virtual wardrobe.

It will be readily apparent in different embodiments that the various methods, algorithms, and computer programs disclosed herein are implemented on non-transitory computer readable storage media appropriately programmed for computing devices. The non-transitory computer readable storage media participates in providing data, for example, instructions that are read by a computer, a processor, or a similar device. In different embodiments, the "non-transitory computer readable storage media" further refers to a single medium or multiple media, for example, a centralized database, a distributed database, and/or associated caches and servers that store one or more sets of instructions that are read by a computer, a processor, or a similar device. The "non-transitory computer readable storage media" further refers to any medium capable of storing or encoding a set of instructions for execution by a computer, a processor, or a similar device and that causes a computer, a processor, or a similar device to perform any one or more of the methods disclosed herein. Common forms of non-transitory computer readable storage media comprise, for example, a floppy disk, a flexible disk, a hard disk, magnetic tape, a laser disc, a Blu-ray Disc® of the Blu-ray Disc Association, any magnetic medium, a compact disc-read only memory (CD-ROM), a digital versatile disc (DVD), any optical medium, a flash memory card, punch cards, paper tape, any other physical medium with patterns of holes, a random access memory (RAM), a programmable read only memory (PROM), an erasable programmable read only memory (EPROM), an electrically erasable programmable read only memory (EEPROM), a flash memory, any other memory chip or cartridge, or any other medium from which a computer can read.

In an embodiment, the computer programs that implement the methods and algorithms disclosed herein are stored and transmitted using a variety of media, for example, the computer readable media in several manners. In an embodiment, hard-wired circuitry or custom hardware is used in place of, or in combination with, software instructions for implementing the processes of various embodiments. Therefore, the embodiments are not limited to any specific combination of hardware and software. The computer program codes comprising computer executable instructions can be implemented in any programming language. Examples of programming languages that can be used comprise C, C++, C#, Java®, JavaScript®, Fortran, Ruby, Perl®, Python®, Visual Basic®, hypertext preprocessor (PHP), Microsoft® .NET, Objective-C®, etc. Other object-oriented, functional, scripting, and/or logical programming languages can also be used. In an embodiment, the computer program codes or software programs are stored on or in one or more mediums as object code. In another embodiment, various aspects of the method and the system 400 disclosed herein are implemented in a non-programmed environment comprising documents created, for example, in a hypertext markup language (HTML), an extensible markup language (XML), or other format that render aspects of a graphical user interface (GUI) or perform other functions, when viewed in a visual area or a window of a browser program. In another embodiment, various aspects of the method and the system 400 disclosed herein are implemented as programmed elements, or non-programmed elements, or any suitable combination thereof.

Where databases are described such as the database 403e, it will be understood by one of ordinary skill in the art that (i) alternative database structures to those described may be employed, and (ii) other memory structures besides databases may be employed. Any illustrations or descriptions of any sample databases disclosed herein are illustrative arrangements for stored representations of information. In an embodiment, any number of other arrangements are employed besides those suggested by tables illustrated in the drawings or elsewhere. Similarly, any illustrated entries of the databases represent exemplary information only; one of ordinary skill in the art will understand that the number and content of the entries can be different from those disclosed herein. In another embodiment, despite any depiction of the databases as tables, other formats comprising relational databases, object-based models, and/or distributed databases are used to store and manipulate the data types disclosed herein. Object methods or behaviors of a database can be used to implement various processes such as those disclosed herein. In another embodiment, the databases are, in a known manner, stored locally or remotely from a device that accesses data in such a database. In embodiments where there are multiple databases in the system 400, the databases are integrated to communicate with each other for enabling simultaneous updates of data linked across the databases, when there are any updates to the data in one of the databases.

The method and the system 400 disclosed herein can be configured to work in a network environment comprising one or more computers that are in communication with one or more devices via a network. In an embodiment, the computers communicate with the devices directly or indirectly, via a wired medium or a wireless medium such as the Internet, a local area network (LAN), a wide area network (WAN) or the Ethernet, a token ring, or via any appropriate communications mediums or combination of communications mediums. Each of the devices comprises processors, examples of which are disclosed above, that are adapted to communicate with the computers. In an embodiment, each of the computers is equipped with a network communication device, for example, a network interface card, a modem, or other network connection device suitable for connecting to a network. Each of the computers and the devices executes an operating system, examples of which are disclosed above. While the operating system may differ depending on the type of computer, the operating system provides the appropriate communications protocols to establish communication links with the network. Any number and type of machines may be in communication with the computers.

The method and the system 400 disclosed herein are not limited to a particular computer system platform, processor, operating system, or network. In an embodiment, one or more aspects of the method and the system 400 disclosed herein are distributed among one or more computer systems, for example, servers configured to provide one or more services to one or more client computers, or to perform a complete task in a distributed system. For example, one or more aspects of the method and the system 400 disclosed herein are performed on a client-server system that comprises components distributed among one or more server systems that perform multiple functions according to various embodiments. These components comprise, for example, executable, intermediate, or interpreted code, which communicate over a network using a communication protocol. The method and the system 400 disclosed herein are not limited to be executable on any particular system or group of systems, and are not limited to any particular distributed architecture, network, or communication protocol.

The foregoing examples have been provided merely for the purpose of explanation and are in no way to be construed as limiting of the method and the system 400 disclosed herein. While the method and the system 400 have been described with reference to various embodiments, it is understood that the words, which have been used herein, are words of description and illustration, rather than words of limitation. Further, although the method and the system 400 have been described herein with reference to particular means, materials, and embodiments, the method, and the system 400 are not intended to be limited to the particulars disclosed herein; rather, the method and the system 400 extend to all functionally equivalent structures, methods and uses, such as are within the scope of the appended claims. Those skilled in the art, having the benefit of the teachings of this specification, may affect numerous modifications thereto and changes may be made without departing from the scope and spirit of the method and the system 400 disclosed herein in their aspects.

I claim:

1. A method for rendering a representation of a user in outfits from a virtual wardrobe, the method comprising:
providing a system for the rendering of the representation of the user in the outfits from the virtual wardrobe, wherein the system comprises an interactive full-length display panel, a camera, and at least one processor communicatively coupled to a non-transitory computer readable storage medium, wherein the at least one processor is configured to execute computer program instructions defined by modules of a virtual dressing system, and wherein the modules of the virtual dressing system comprise a scanning module, a data management module, a weather module, a computation module, and a rendering module;

acquiring images of the outfits comprising clothing and accessories via one of scanning the outfits by the scanning module of the virtual dressing system, and receiving images of the outfits from a user device, by the data management module of the virtual dressing system, to store the images of the outfits in the virtual wardrobe;

acquiring weather information for displaying current weather and weather forecast information of physical locations predetermined by the user on a portion of the interactive full-length display panel, by the weather module of the virtual dressing system;

scanning the body of the user to generate a user image, by the scanning module of the virtual dressing system;

selecting the outfits appropriate to the acquired weather information of the physical location predetermined by the user and dimensions of the generated user image from the images of the outfits in one of the virtual wardrobe and preselected locations on a computer network, by the computation module of the virtual dressing system;

displaying images of the selected outfits on the interactive full-length display panel;

receiving a choice of an outfit from one of the displayed images of the selected outfits and other outfits in the virtual wardrobe as a corresponding request from the user via one of the interactive full-length display panel and the user device, by the data management module of the virtual dressing system;

rendering a representation of the user in the received choice of the outfit on the interactive full-length display panel, by the rendering module of the virtual dressing system, when the user is present in front of the system; and allowing remote interaction for the user via an application programming interface provided on the user device when the user is at a location that is remote from the system, by the data management module of the virtual dressing system, and providing two choices to the user for the remote interaction, wherein the two choices comprise:
 the user interacting with the representation of the user in the received choice of the outfit, via the user device, wherein the rendering is on the interactive full-length display panel; and
 the user interacting with the representation of the user in the received choice of the outfit, wherein the rendering is on a display screen of the user device.

2. The method of claim 1 further comprising updating the rendered representation of the user on receiving a choice of a different outfit as the corresponding request from the user via one of the interactive full-length display panel and the user device, by the rendering module of the virtual dressing system.

3. The method of claim 1, wherein the virtual wardrobe comprises a virtual representation of real outfits stored in a personal wardrobe of the user.

4. The method of claim 1, wherein the interactive full-length display panel displays the entire length of a user to scale.

5. The method of claim 1, wherein the outfits comprise mixing and matching of items of clothing with items of accessories.

6. The method of claim 1, wherein the choice of an outfit received from the user is saved in a section of the virtual wardrobe on receiving the corresponding request from the user via one of the interactive full-length display panel and the user device.

7. The method of claim 1, wherein an individual profile of the user comprises the generated user image, the virtual wardrobe, and user preferences, thereby providing for utilization of the interactive full-length display panel by a plurality of users each with a separate individual profile.

8. The method of claim 1, wherein a selection of the rendered representation of the user and the images of the outfits in the virtual wardrobe are uploaded to social media on receiving the corresponding request from the user via one of the interactive full-length display panel and the user device.

9. A non-transitory computer readable storage medium having embodied thereon, computer program codes comprising instructions executable by at least one processor for rendering a representation of a user in outfits from a virtual wardrobe, the computer program codes comprising:
 a first computer program code for acquiring images of the outfits comprising clothing and accessories via one of scanning the outfits and receiving the images of the outfits from a user device to store the images of the outfits in the virtual wardrobe;
 a second computer program code for acquiring weather information for displaying current weather and weather forecast information of physical locations predetermined by the user on a portion of an interactive full-length display panel;
 a third computer program code for scanning the body of the user to generate a user image;
 a fourth computer program code for selecting the outfits appropriate to the acquired weather information of the physical location predetermined by the user and dimensions of the generated user image from the images of the outfits in one of the virtual wardrobe and preselected locations on a computer network;
 a fifth computer program code for displaying the images of the selected outfits on the interactive full-length display panel;
 a sixth computer program code for receiving a choice of the outfit from one of the displayed images of the selected outfits and other outfits in the virtual wardrobe as a corresponding request from the user via one of the interactive full-length display panel and the user device; and
 a seventh computer program code for rendering a representation of the user in the received choice of the outfit on the interactive full-length display panel, when the user is present in front of the system;
 an eighth computer program code for allowing remote interaction for the user via an application programming interface provided on the user device when the user is at a location that is remote from the system, and providing two choices to the user for the remote interaction, wherein the two choices comprise:
  the user interacting with the representation of the user in the received choice of the outfit, via the user device, wherein the rendering is on the interactive full-length display panel; and
  the user interacting with the representation of the user in the received choice of the outfit, wherein the rendering is on a display screen of the user device.

10. The non-transitory computer readable storage medium of claim 9, further comprising:
 a ninth computer program code for updating the rendered representation of the user on receiving a choice of a different outfit as the corresponding request from the user via one of the interactive full-length display panel and the user device;

a tenth computer program code for saving the choice of the outfit received from the user in a section of the virtual wardrobe on receiving the corresponding request from the user via one of the interactive full-length display panel and the user device;

an eleventh computer program code for storing an individual profile for the user comprising the generated user image, the virtual wardrobe and user preferences on the non-transitory computer readable storage medium, thereby providing for utilization of the interactive full-length display panel by a plurality of users each with a separate individual profile; and a twelfth computer program code for uploading a selection of the rendered representation of the user and the images of the outfits in the virtual wardrobe to social media on receiving the corresponding request from the user via one of the interactive full-length display panel and the user device.

\* \* \* \* \*